US011199279B2

(12) United States Patent
Uffner et al.

(10) Patent No.: US 11,199,279 B2
(45) Date of Patent: Dec. 14, 2021

(54) ELEVATED MODULAR HOSE HANGER

(71) Applicant: Suncast Technologies, LLC, Palm Beach Gardens, FL (US)

(72) Inventors: Michael Uffner, Naperville, IL (US); Torrence Anderson, Overland Park, KS (US); Stephen Whitehead, Elgin, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 16/839,992

(22) Filed: Apr. 3, 2020

(65) Prior Publication Data

US 2021/0310585 A1 Oct. 7, 2021

(51) Int. Cl.
*F16L 3/23* (2006.01)
*F16L 11/00* (2006.01)
*F16L 3/02* (2006.01)

(52) U.S. Cl.
CPC .............. *F16L 3/23* (2013.01); *F16L 3/02* (2013.01); *F16L 11/00* (2013.01)

(58) Field of Classification Search
CPC ..... F16L 3/23; F16L 3/02; F16L 11/00; B25H 2701/33; B05B 15/622; E04H 12/2215; A45F 3/44
See application file for complete search history.

(56) References Cited

U.S. PATENT DOCUMENTS

| | | | | |
|---|---|---|---|---|
| 4,144,971 A * | 3/1979 | Balibrea | ................. | F41A 23/18 211/64 |
| 5,067,683 A * | 11/1991 | Wager | ........................ | F41J 1/10 248/545 |
| D341,767 S * | 11/1993 | Brueske | ......................... | D8/356 |
| 5,419,362 A * | 5/1995 | Blackaby | ............... | A62C 33/04 137/355.16 |
| D398,199 S | 9/1998 | Bowling et al. | | |
| 6,079,675 A * | 6/2000 | Hsu | ......................... | B65G 7/12 248/68.1 |
| 6,234,444 B1 * | 5/2001 | Haddad | .................. | A01G 9/122 248/156 |
| 6,708,934 B2 * | 3/2004 | Brueske | ............... | B65H 75/366 248/75 |
| 6,823,814 B2 * | 11/2004 | Bukky | ...................... | G09F 3/12 116/202 |

(Continued)

OTHER PUBLICATIONS

Yardguard Garden Hose Holder Hanger, Heavy Duty Metal Water Hose Holder Free Standing Garden Hose Storage Hose Stand for Outside Yard, Retrieved from Internet: www.Amazon.com, (Nov. 11, 2020).

(Continued)

*Primary Examiner* — Christopher Garft
(74) *Attorney, Agent, or Firm* — McHale & Slavin, P.A.

(57) ABSTRACT

The invention involves a modular elevated hose hanger system. The system includes a vertical support member suitable for insertion into a ground surface for elevating the hose hanger and preventing unwanted rotation of the hose hanger about the vertical axis of the vertical support member. The hose hanger is constructed of a cylindrical segment having features for interlocking with the vertical support member. A modular face plate cooperates with the cylindrical segment to provide structural support to the cylindrical segment while being easily removable and replaceable.

13 Claims, 8 Drawing Sheets

(56) References Cited

U.S. PATENT DOCUMENTS

| | | | | |
|---|---|---|---|---|
| D554,979 | S | * | 11/2007 | Hsu .............................. D8/356 |
| D813,649 | S | | 3/2018 | Southard |
| D813,650 | S | | 3/2018 | Southard |
| D903,473 | S | * | 12/2020 | Peng .............................. D8/356 |
| 2008/0029639 | A1 | * | 2/2008 | Dethier ............... B65H 75/403 242/603 |

OTHER PUBLICATIONS

54 Inch Hose Holder Large, Retrieved from Internet: www.Amazon.com, (Nov. 11, 2020).

Aqua Joe SJ-SHSBB-Gry Garden Hose with Solid Brass Faucet w/Quick Install Anchor Base, Retrieved from Internet: www.Amazon.com, (Nov. 11, 2020).

Yard Butler 100049499 Hose Hanger with Faucet, Retrieved from Internet: www.Amazon.com, (Nov. 11, 2020).

Liberty Garden 649-KD Hyde Park Decorative Metal Garden Hose Stand, Retrieved from Internet: www.Amazon.com, (Nov. 11, 2020).

Urban Deco Garden Hose Holder Metal Decorative Hose Stand Heavy Duty Hose Holder Free Standing Garden Hose Storage Hose Stand, Retrieved from Internet: www.Amazon.com, (Nov. 11, 2020).

GOFORWILD Garden Hose Holder, Decorative Hose Butler Sturdy Water Hose Rack, Durable Water Hose Hanger, Retrieved from Internet: www.Amazon.com, (Nov. 11, 2020).

Artigarden Garden Hose Holder—Free Standing Metal Water Hose Stand Heavy Duty Flexible Pipe Storage Hanger Organizer for Lawn & Yard, Retrieved from Internet: www.Amazon.com, (Nov. 11, 2020).

Metal Hose Holder, Liberty Garden Products, Retrieved from Internet: www.Amazon.com, (Nov. 11, 2020).

TREEZITEK Free Standing Garden Hose Holder Hanger Heavy Duty Metal Water Hose Storage Stand Rack for Yard Lawn, Retrieved from Internet: www.Amazon.com, (Nov. 11, 2020).

Orgrimmar Detatchable Heavy Duty Metal Water Hose Reel Decorative Garden Hose Holder for Outside, Retrieved from Internet: www.Amazon.com, (Nov. 11, 2020).

Giraffe Garden Hose Holder with 130ft 3/4 in. Capacity Detatchable Metal Water Hose Holder Decorative Hose Stand Heavy Duty Free Standing Garden Hose Storage for Outside Yard, Retrieved from Internet: www.Amazon.com, (Nov. 11, 2020).

* cited by examiner

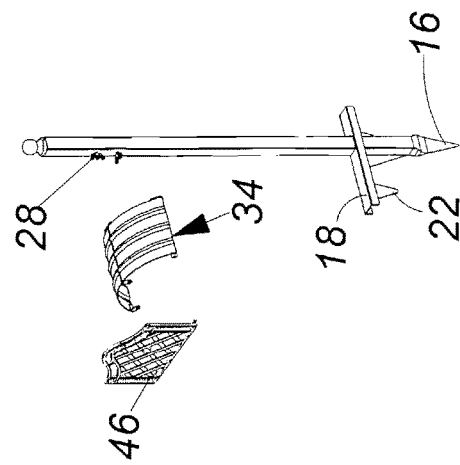
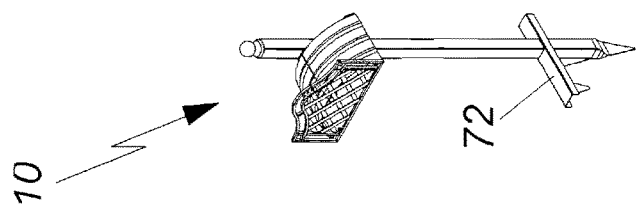
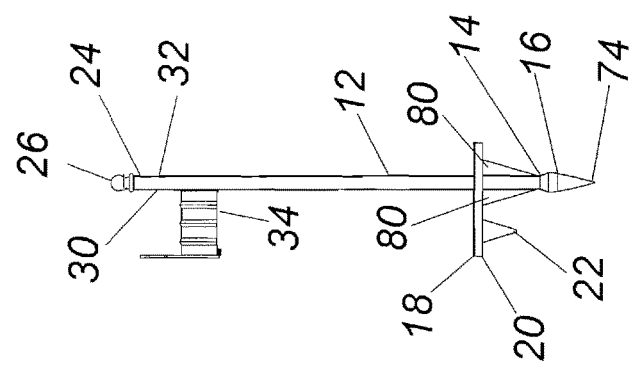
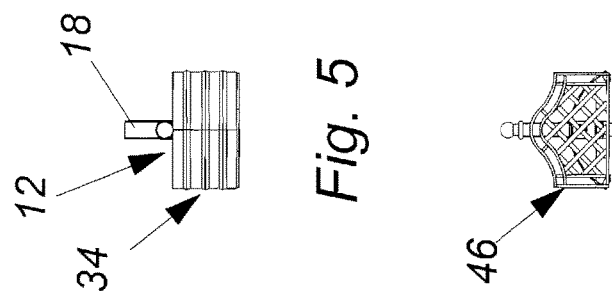

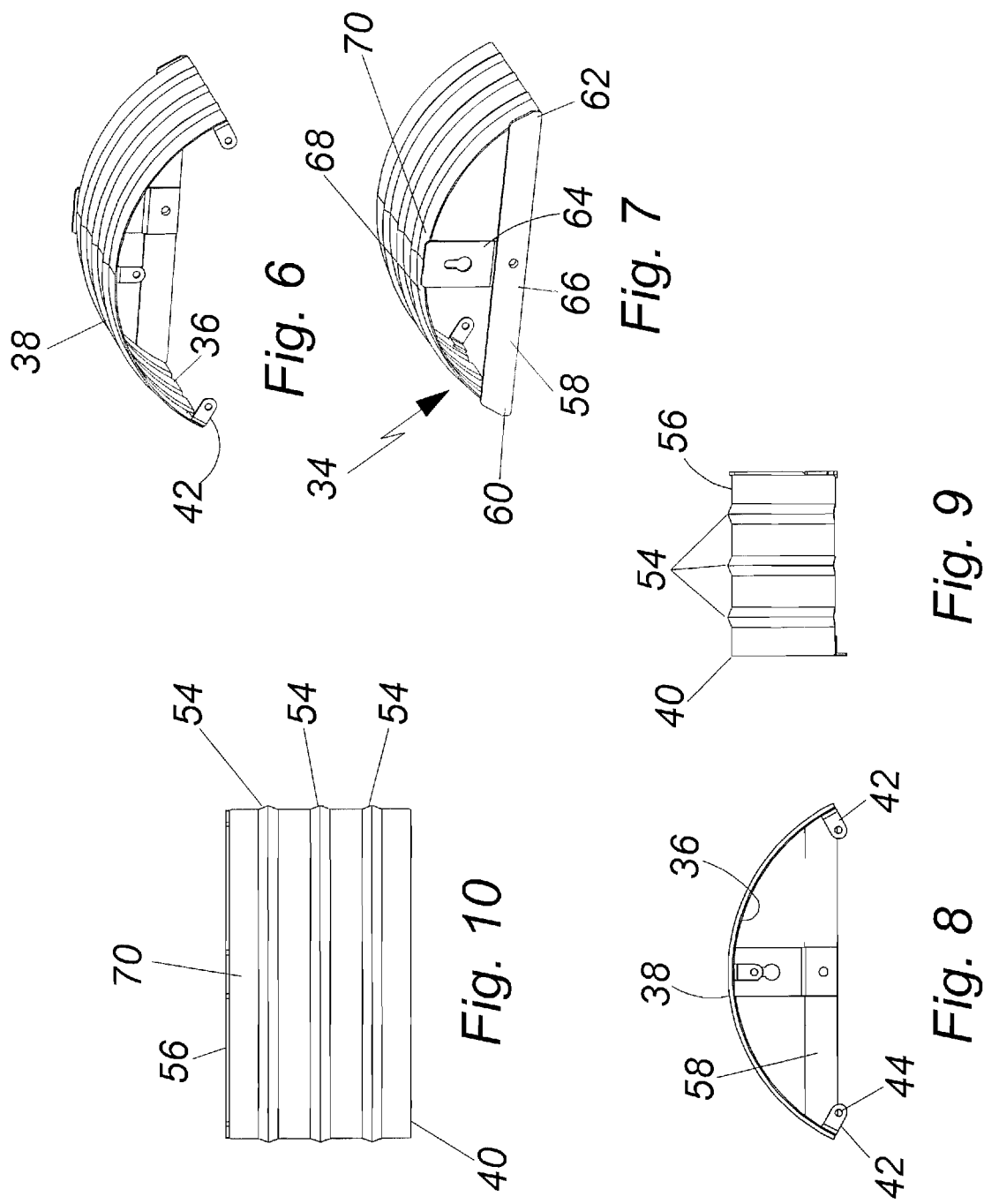

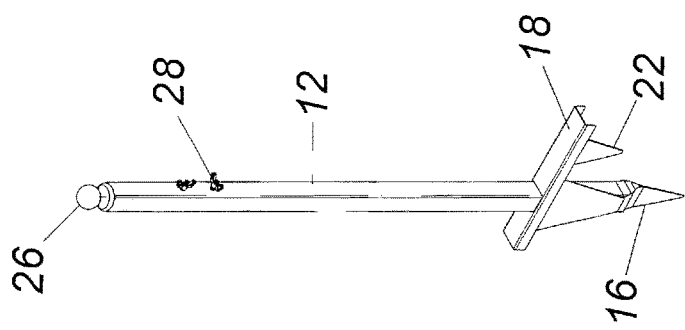
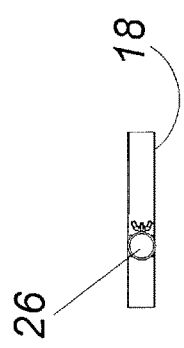
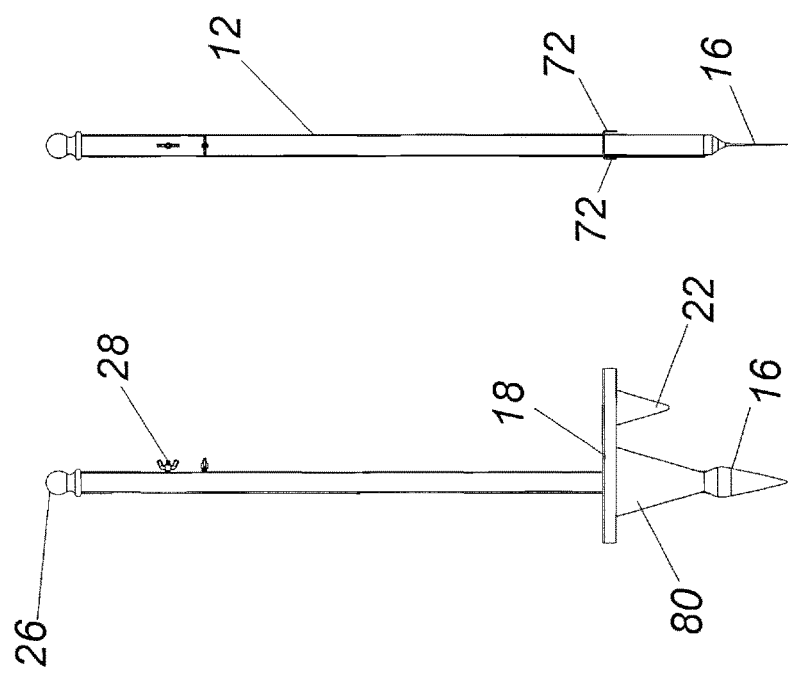

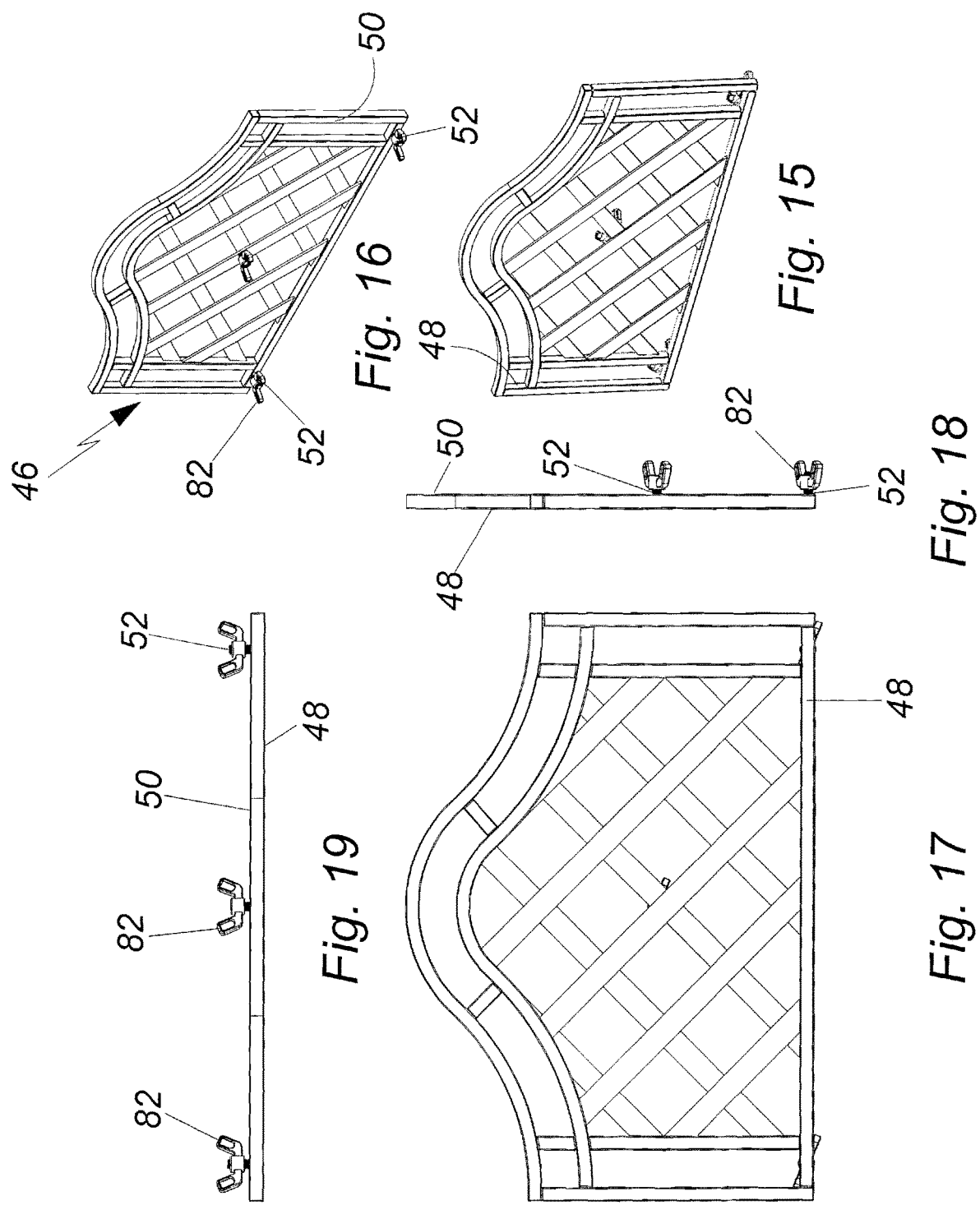

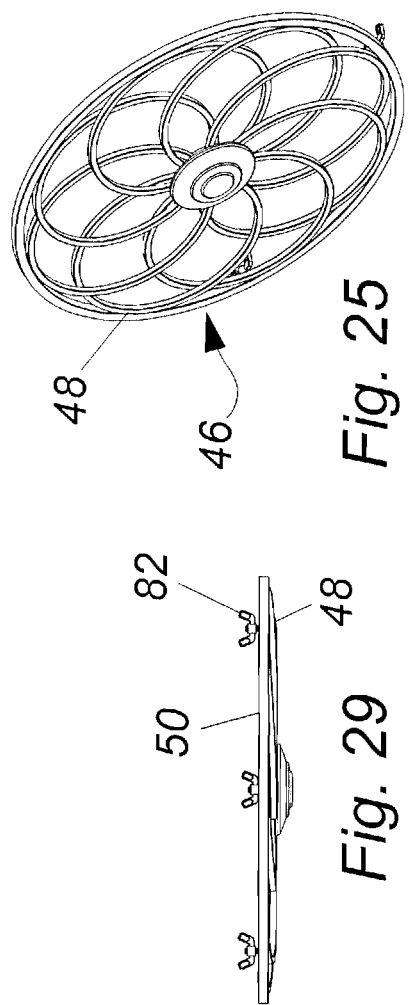
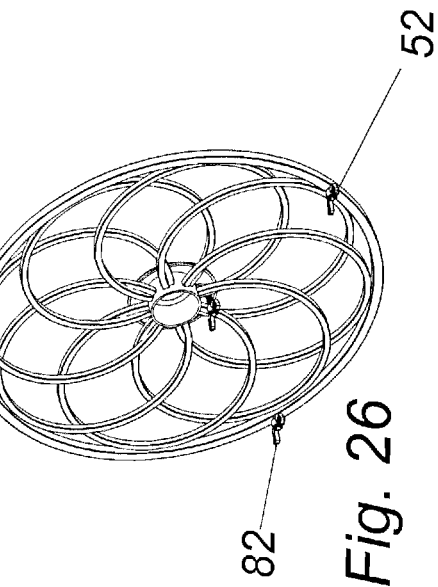
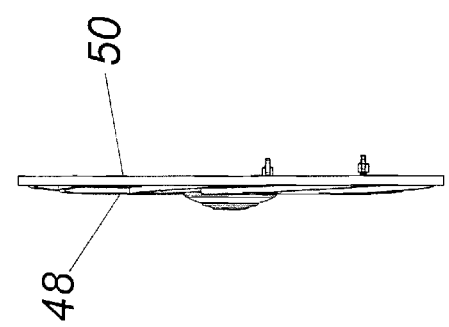
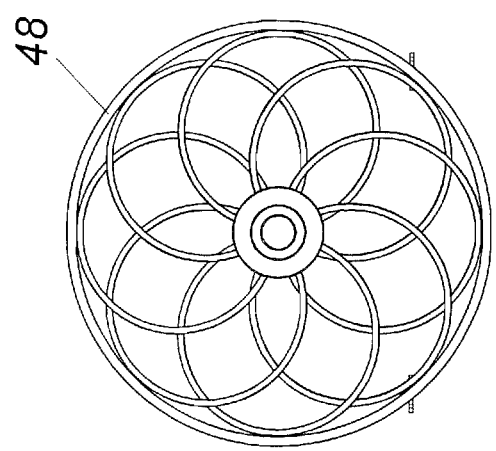
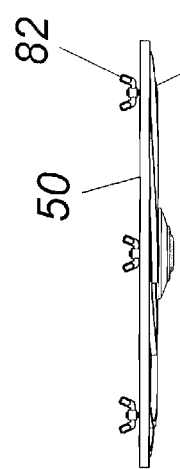
Fig. 25
Fig. 26
Fig. 27
Fig. 28
Fig. 29

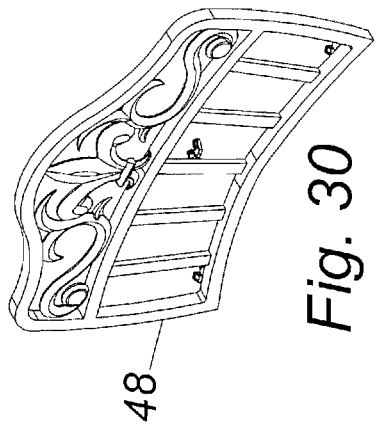
Fig. 30
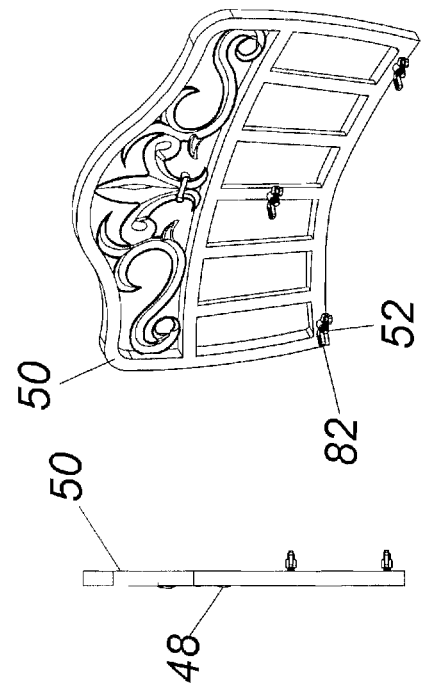
Fig. 31
Fig. 33
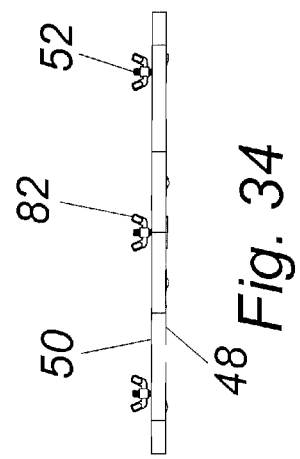
Fig. 34
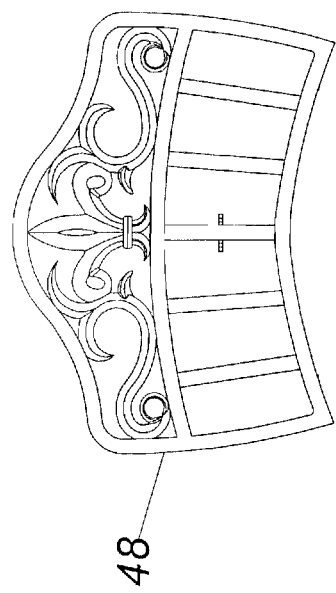
Fig. 32

ELEVATED MODULAR HOSE HANGER

FIELD OF INVENTION

The present invention generally relates to hose hangers, and more particularly, to a modular hose hanger supported in an elevated position.

BACKGROUND INFORMATION

Hose hangers are well-known devices that help organize and retain a hose, such as a garden hose, when it is not in use. The typical hose hanger device is configured so that a garden hose can be coiled about a surface that is supported or mounted on a building, such as a homeowner's house. The hose hanger is usually mounted adjacent a hose bib, so that the inlet end of the hose can be conveniently connected to the water source. The entire hose is coiled on the hose hanger for storage. Even during use, a portion of the hose may remain coiled on the hose hanger while the remaining portion is uncoiled for use.

Features are provided on some hose hangers that facilitate coiling and uncoiling the hose. Other types of hose hangers provide a storage compartment for storing a collection of spray nozzles or gardening tools, or the like.

One problem with this type of hose hanger is the reliance upon a vertical surface, such as a wall, for support. Walls are not always located in a desirable location for use of the hose. Another drawback relates to the inability to alter the appearance of the device without replacing the entire hose hanger. This same deficiency makes repair of the hose hanger impossible because the devices are welded or otherwise permanently secured together. Still yet another disadvantage relates to the shipping space required to transport permanently assembled elevated hose hangers. By breaking the device down, the required shipping space can be significantly reduced, and therefore the related shipping costs.

There are ergonomic needs that a modular elevated hose hanger system must satisfy in order to achieve acceptance by the end user. The system must be easily and quickly assembled using minimal hardware and requiring a minimal number of tools. Further, the system should not require excessive strength to assemble or include heavy component parts. Moreover, the system must assemble together in such a way so as not to detract from the aesthetic appearance of the elevated hose hanger.

Thus, the present invention provides a modular elevated hose hanger which overcomes the disadvantages of prior art hose hangers. The modular elevated hose hanger system of the present invention not only provides for relative ease in the assembly and replacement of hose hanger components, it also permits changing the appearance of the hose hanger without the need to replace the entire device.

SUMMARY OF THE INVENTION

Briefly, the invention involves a modular elevated hose hanger system. The system includes a vertical support member suitable for insertion into a ground surface for elevating the hose hanger and preventing unwanted rotation of the hose hanger about the vertical axis of the vertical support member. The hose hanger is constructed of a cylindrical segment having features for interlocking with the vertical support member. A modular face plate cooperates with the cylindrical segment to provide structural support to the cylindrical segment, while being easily removable and replaceable.

Accordingly, it is an objective of the present invention to provide a modular elevated hose hanger.

It is a further objective of the present invention to provide an elevated hose hanger having interchangeable components.

It is yet a further objective of the present invention to provide an interchangeable face plate for the hose hanger that provides structural integrity to the arcuate portion of the hose hanger.

It is another objective of the present invention to provide an elevated hose hanger that resists rotation about the vertical axis of the vertical support member.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

BRIEF DESCRIPTION OF THE FIGURES

FIG. 1 is a top front right perspective view of one embodiment of the present invention;

FIG. 2 is an exploded view of the embodiment shown in FIG. 1, illustrating the modularity of the present device;

FIG. 3 is a front view of the embodiment shown in FIG. 1;

FIG. 4 is a right side view of the embodiment illustrated in FIG. 1, the left side being a mirror image thereof;

FIG. 5 is a top view of the embodiment illustrated in FIG. 1;

FIG. 6 is a front perspective view of one embodiment of the cylindrical segment;

FIG. 7 is a rear perspective view of the embodiment illustrated in FIG. 6;

FIG. 8 is a front view of the embodiment illustrated in FIG. 6;

FIG. 9 is a left side view of the embodiment illustrated in FIG. 6, the left side view being a mirror image thereof;

FIG. 10 is a front view of the embodiment illustrated in FIG. 6;

FIG. 11 is a top front left perspective view of one embodiment of the vertical support member;

FIG. 12 is a front view of the embodiment illustrated in FIG. 11;

FIG. 13 is a left side view of the embodiment illustrated in FIG. 11, the right side view being a mirror image thereof;

FIG. 14 is a top view of the embodiment illustrated in FIG. 11;

FIG. 15 is a front perspective view of one embodiment of a structural front face assembly;

FIG. 16 is a rear perspective view of the embodiment illustrated in FIG. 15;

FIG. 17 is a front view of the embodiment illustrated in FIG. 15;

FIG. 18 is a right side view of the embodiment illustrated in FIG. 15, the left side view being a mirror image thereof;

FIG. 19 is a top view of the embodiment illustrated in FIG. 15;

FIG. 25 is a front perspective view of one embodiment of a structural front face assembly;

FIG. 26 is a rear perspective view of the embodiment illustrated in FIG. 25;

FIG. 27 is a front view of the embodiment illustrated in FIG. 25;

FIG. 28 is a right side view of the embodiment illustrated in FIG. 25, the left side view being a mirror image thereof;

FIG. 29 is a top view of the embodiment illustrated in FIG. 25;

FIG. 30 is a front perspective view of one embodiment of a structural front face assembly;

FIG. 31 is a rear perspective view of the embodiment illustrated in FIG. 30;

FIG. 32 is a front view of the embodiment illustrated in FIG. 30;

FIG. 33 is a right side view of the embodiment illustrated in FIG. 30, the left side view being a mirror image thereof;

FIG. 34 is a top view of the embodiment illustrated in FIG. 30;

DETAILED DESCRIPTION OF THE PREFERRED EMBODIMENTS

Figure 21:
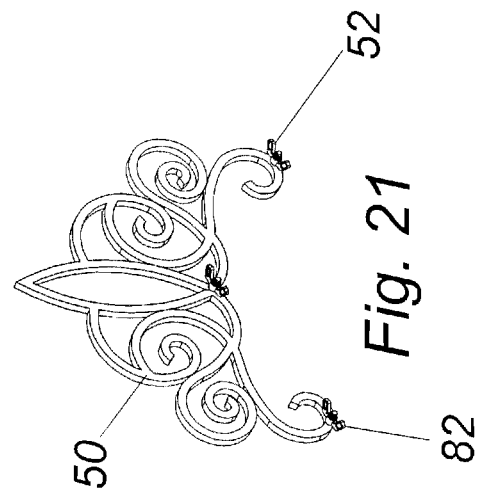
FIG. 21 is a rear perspective view of the embodiment illustrated in FIG. 20.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 20:
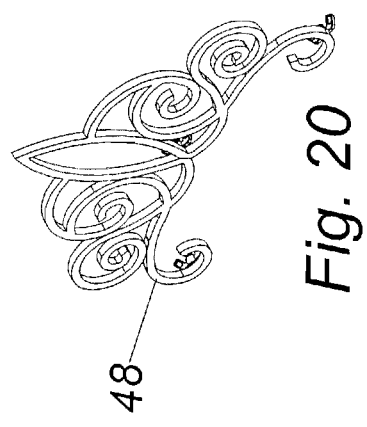
FIG. 20 is a front perspective view of one embodiment of a structural front face assembly.
Figure 23:
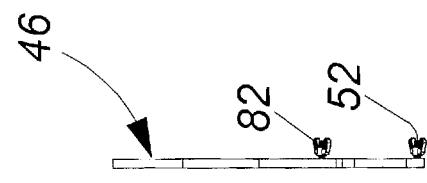
FIG. 23 is a right side view of the embodiment illustrated in FIG. 20, the left side view being a mirror image thereof.
Figure 24:
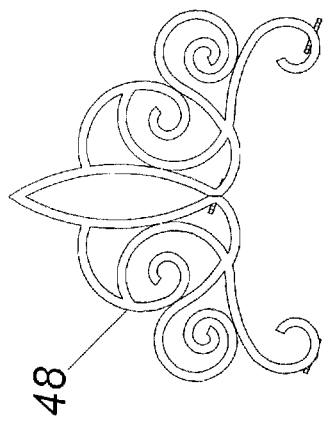
FIG. 24 is a top view of the embodiment illustrated in FIG. 20.
Figure 22:
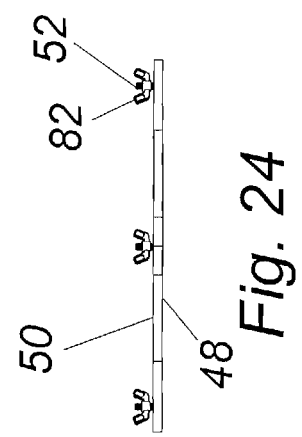
FIG. 22 is a front view of the embodiment illustrated in FIG. 20.
Figure 35:
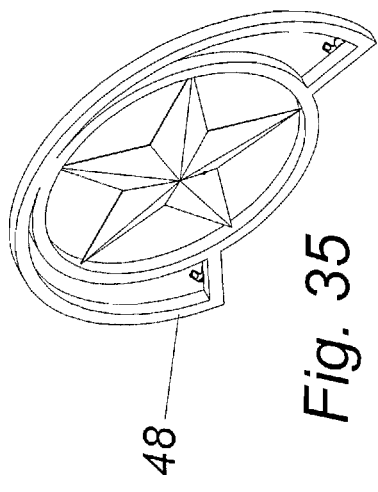
FIG. 35 is a front perspective view of one embodiment of a structural front face assembly.
Figure 36:
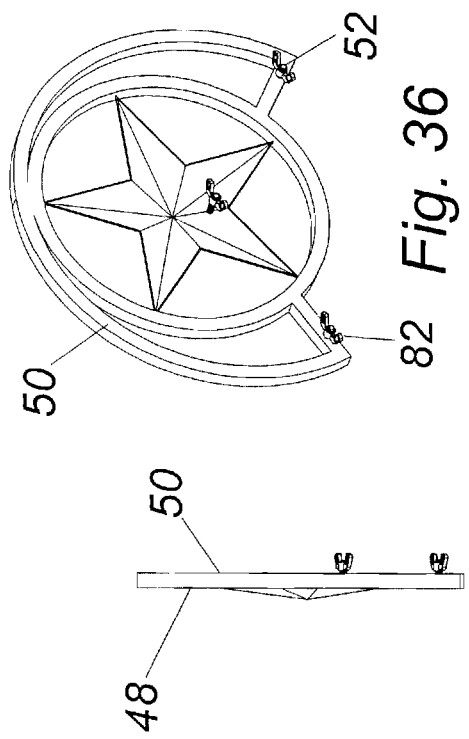
FIG. 36 is a rear perspective view of the embodiment illustrated in FIG. 35.
Figure 38:
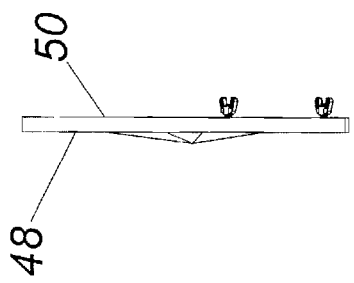
FIG. 38 is a right side view of the embodiment illustrated in FIG. 35, the left side view being a mirror image thereof.
Figure 39:
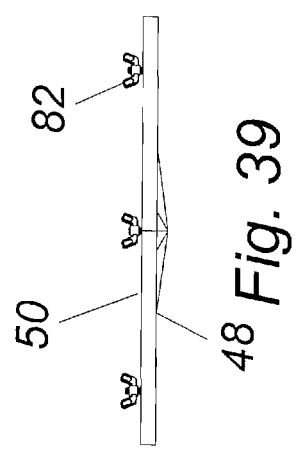
FIG. 39 is a top view of the embodiment illustrated in FIG. 35.
Figure 37:
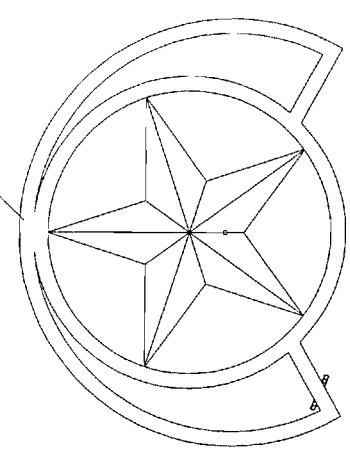
FIG. 37 is a front view of the embodiment illustrated in FIG. 35.

Referring generally to FIGS. 1-39, a modular elevated hose hanger system 10 for supporting a garden hose above a ground surface is illustrated. The modular elevated hose hanger system 10 includes a vertical support member 12, said vertical support member having a first end 14 for engagement with a ground surface, said first end 14 including a ground penetrating spike member 16, an outrigger member 18 positioned adjacent and above said ground penetrating spike member 16, a distal end 20 of said outrigger 18 including a second ground penetrating spike member 22. The outrigger 18 is preferably a U-shaped member when viewed from the end. The legs 72 of the U-shaped member are oriented to engage the ground surface to resist rotation of the modular hose hanger 10 during use. A distal end 74 of the first ground penetrating spike 16 includes a blade portion 76 for penetration of hard ground surfaces. In a preferred embodiment, the first ground penetrating spike member 16 includes at least one gusset 80 extending along the length of the first ground penetrating spike member 16 and secured to a lower surface of the outrigger 18 to provide structural support to the first ground penetrating spike member 16. The gusset 80 also provides further resistance to rotation of the elevated modular hose hanger during use. In at least some embodiments, the second ground penetrating spike member 22 may be a blade to facilitate easy penetration of hard ground surface while providing substantial resistance to rotation of the hose hanger 10 during use.

A second end 24 of said vertical support member 12 includes a finial portion 26, and a mount assembly 28 secured to a sidewall of said vertical support member 12. The finial portion 26 is removable and replaceable to facilitate repairs or remodeling of the hose hanger. The mount assembly 28 is spaced away from the finial portion 26 so that a top portion 30 of the vertical support member 12 functions as a rear limiter 32 for the garden hose member. The rear limiter 32 limits the amount of hose that can be hung over the cylindrical segment 34 without spilling over the top of the rear limiter 32. In this manner, the construction of the device helps to prevent user from overloading the hose hanger 10. The mount assembly 28 is generally constructed and arranged to secure the cylindrical segment 34 in a perpendicular relationship to the vertical support member 12 for placement of a garden hose member in a hanging manner. In general, the cylindrical segment 34 is formed from metal, including an inner surface 36 and an outer surface 38. A front portion 40 of the inner surface 36 includes at least three tabs 42 secured thereto. The three tabs 42 are spaced apart and include an aperture 44 for cooperation with a fastener 52 to secure a face plate 46 to the front portion 40 of the cylindrical segment 34. In a most preferred embodiment, the three tabs 42 are equidistantly spaced with one tab 42 at each distal end of the cylindrical segment 34 and one tab 42 positioned in the center portion thereof. While, in the preferred embodiment, the tab apertures 44 are clearance drilled for cooperation with the fasteners 52, the apertures 44 may include threads in the apertures 44 without departing from the scope of the invention. In at least one embodiment, a plurality of strengthening beads 54 are formed into the sheet metal to add rigidity and additional weight bearing capacity to the cylindrical segment 34. The strengthening beads 54 may be rolled into the metal or stamped, and are generally defined as permanent elongated displacement of the material forming the cylindrical segment 34.

The face plate 46 is generally constructed and arranged to form the front face of the hose hanger 10. The front face is preferably constructed from a metal, such as iron or steel including decoration to provide aesthetic appearance to the elevated hose hanger 10. The face plate 46 includes a front surface 48 and a rear surface 50, the rear surface 50 including a plurality of fasteners 52 secured to and positioned on the rear surface 50 to align with the tabs 42 secured to the front portion 40 of the cylindrical segment 34. In this manner, the face plate 46 provides a structural support between the distal ends and the upper portion of the cylindrical segment 34. The plurality of fasteners 52 secured to the rear surface 50 of the face plate 46 are preferably threaded fasteners. The threaded fasteners 52 may include wing nuts 82 for hand attachment and removal of the face plate 46. In at least some embodiments, the threaded fasteners 52 are welded to the rear surface 50. In other embodiments, the threaded fasteners may be integrally formed or otherwise attached to the rear surface 50. Also, in at least some embodiments, the face plate 46 extends above an uppermost surface 70 of the cylindrical segment 34 to form a front limiter for the hose hanger 10.

Still referring to FIGS. 1-39, and more particularly to FIGS. 6-10, a rear portion 56 of the cylindrical segment 34 includes a rear support member 58 to provide structural support to the rear portion 56 of the cylindrical segment 34. The rear support member 58 extends from a first distal end 60 of the rear portion 56 of the cylindrical segment 34 to the second distal end 62 of the cylindrical segment 34. This positioning also facilitates using the rear support member 58 to secure the cylindrical segment 34 to the vertical support member 12. In at least one embodiment, the modular hose hanger 10 includes a vertical support member 64 for providing additional structural support to the cylindrical segment 34. The vertical support member 64 is secured, preferably by welding, to a central portion 66 of the rear support member 58 and extends to an uppermost portion 68 of the inner surface 36.

What is claimed is:

1. A modular elevated hose hanger system comprising:
a vertical support member, said vertical support member having a first end for engagement with a ground surface, said first end including a ground penetrating spike member, an outrigger member positioned adjacent and above said ground penetrating spike member, a distal end of said outrigger member including a second ground penetrating spike member, a second end of said vertical support member including a finial portion, and a mount assembly secured to a sidewall of said vertical support member, said mount assembly spaced away from said finial portion so that a top portion of said vertical support member functions as a rear limiter, said mount assembly constructed and arranged to secure a cylindrical segment in a perpendicular relationship to said vertical support member;
said cylindrical segment formed from metal, including an inner surface and an outer surface, a front portion of said inner surface including at least three tabs secured thereto, said tabs spaced apart and including an aperture for cooperation with a fastener to secure a face plate to the front portion of said cylindrical segment, a rear portion of said cylindrical segment includes a rear support member, said rear support member extending from one distal end of the rear portion of said cylindrical segment to another distal end of said cylindrical segment, said rear support member to provide structural support to said cylindrical segment;
a face plate, said face plate including a front surface and a rear surface, said rear surface including a plurality of fasteners secured to and positioned on said rear surface to align with said tabs secured to said front portion of said cylindrical segment, said face plate providing a structural support to the front portion of said cylindrical segment when secured to the at least three tabs.

2. The modular hose hanger of claim 1 including a plurality of strengthening beads formed into said metal to add rigidity to said cylindrical segment; said strengthening beads defined as permanent elongated displacement of the material forming said cylindrical segment.

3. The modular hose hanger of claim 1 further including a cylindrical segment vertical support member, said cylindrical segment vertical support member secured to and extending between a central portion of said rear support member and an uppermost portion of said inner surface.

4. The modular hose hanger of claim 1 wherein said plurality of said fasteners secured to the rear surface of said face plate are threaded fasteners.

5. The modular hose hanger of claim 4 wherein said threaded fasteners include wing nuts for hand attachment and removal of said face plate.

6. The modular hose hanger of claim 4 wherein said threaded fasteners are welded to said rear surface.

7. The modular hose hanger of claim 4 wherein said threaded fasteners are integrally formed to said rear surface.

8. The modular hose hanger of claim 1 wherein said face plate extends above an uppermost surface of said cylindrical segment to form a front limiter for said hose hanger.

9. The modular hose hanger of claim 1 wherein said outrigger is a U-shaped member, legs of said U-shaped member oriented to engage said ground surface to resist rotation of said modular hose hanger during use.

10. The modular hose hanger of claim 1 wherein a distal end of said first ground penetrating spike includes a blade portion for penetration of hard ground surfaces.

11. The modular hose hanger of claim 1 wherein said second ground penetrating spike is a blade.

12. The modular hose hanger of claim 1 wherein said first ground penetrating spike includes at least one gusset extending along the length of said first ground penetrating spike and secured to a lower surface of said outrigger to provide structural support to said first ground penetrating spike, said gusset also providing further resistance to rotation of the elevated modular hose hanger during use.

13. The modular hose hanger of claim 1 wherein said finial portion is removable and replaceable.

* * * * *